(12) United States Patent
Marten et al.

(10) Patent No.: US 7,985,780 B2
(45) Date of Patent: *Jul. 26, 2011

(54) CYLINDRICAL MOULDINGS BASED ON CELLULAR POLYURETHANE ELASTOMERS

(75) Inventors: Elke Marten, Ostercappeln (DE); Andreas Heidemann, Stolzenau-Nendorf (DE); Markus Schütte, Osnabrück (DE); Michael Strauβ, Lemförde (DE); Heinrich Bollmann, Alfhausen (DE); Ralf Hansen, Osnabrück (DE)

(73) Assignee: BASF SE, Ludwigshafen (DE)

( * ) Notice: Subject to any disclaimer, the term of this patent is extended or adjusted under 35 U.S.C. 154(b) by 574 days.

This patent is subject to a terminal disclaimer.

(21) Appl. No.: 11/816,325

(22) PCT Filed: Feb. 21, 2006

(86) PCT No.: PCT/EP2006/060145
§ 371 (c)(1),
(2), (4) Date: Aug. 15, 2007

(87) PCT Pub. No.: WO2006/089890
PCT Pub. Date: Aug. 31, 2006

(65) Prior Publication Data
US 2008/0164112 A1  Jul. 10, 2008

(30) Foreign Application Priority Data

Feb. 22, 2005 (DE) .......... 10 2005 008 242

(51) Int. Cl.
*C08G 18/28* (2006.01)

(52) U.S. Cl. ........ 521/159; 264/328.6; 264/330; 425/543; 521/130; 521/131; 521/170; 521/174; 521/914

(58) Field of Classification Search .......... 521/130, 521/131, 159, 170, 174, 914; 425/543; 264/328.6, 264/330
See application file for complete search history.

(56) References Cited

U.S. PATENT DOCUMENTS

| | | | |
|---|---|---|---|
| 4,383,051 A * | 5/1983 | Meyborg et al. ........ | 521/176 |
| 4,798,851 A | 1/1989 | Werner et al. | |
| 5,672,635 A | 9/1997 | Narayan et al. | |
| 5,695,791 A | 12/1997 | Baumann et al. | |
| 6,037,383 A * | 3/2000 | Krech et al. ........ | 521/155 |
| 7,795,322 B2 | 9/2010 | Marten et al. | |
| 2007/0129455 A1 | 6/2007 | Schütte et al. | |
| 2007/0179208 A1 | 8/2007 | Schütte et al. | |
| 2008/0161440 A1 | 7/2008 | Marten et al. | |
| 2008/0258328 A1 | 10/2008 | Hansen et al. | |

FOREIGN PATENT DOCUMENTS

| | | |
|---|---|---|
| DE | 3613650 A1 | 10/1987 |
| DE | 4438143 | 5/1996 |
| EP | 0178562 A2 | 4/1986 |
| EP | 0449331 A2 | 10/1991 |
| FR | 2559862 | 8/1985 |
| JP | 11302355 | 11/1999 |
| WO | WO-96/11219 A1 | 4/1996 |
| WO | WO-2005/082968 A1 | 9/2005 |
| WO | WO-2005/116101 A1 | 12/2005 |
| WO | WO-2006/056382 A1 | 6/2006 |
| WO | WO-2006/066763 A1 | 6/2006 |
| WO | WO-2006/089891 A1 | 8/2006 |
| WO | WO-2006/094998 A1 | 9/2006 |
| WO | WO-2006/097507 A1 | 9/2006 |
| WO | WO-2007/068628 A1 | 6/2007 |

* cited by examiner

*Primary Examiner* — John Cooney
(74) *Attorney, Agent, or Firm* — Connolly Bove Lodge & Hutz LLP (57) ABSTRACT

A cylindrical molding based on cellular polyurethane elastomers having a density according to DIN EN ISO 845 of from 300 to 900 kg/m$^3$, a tensile strength according to DIN EN ISO 1798 of $\geq 2.0$ N/mm$^2$, an elongation at break according to DIN EN ISO 1798 of $\geq 200\%$ and a tear propagation resistance according to DIN ISO 34-1 B (b), of $\geq 8$ N/mm, wherein the cellular polyurethane elastomer is based on the reaction (i) of a prepolymer having isocyanate groups and based on
  (a) methylenediphenyl diisocyanate (MDI) and
  (b1) polyetherdiol having a molecular weight of from 1500 g/mol to 3000 g/mol and based on propylene oxide and/or ethylene oxide, with
(ii) a crosslinking component comprising
  (b2) polyetheralcohol having a nominal functionality with respect to isocyanates of from 2 to 3 and a molecular weight of from 1500 g/mol to 6000 g/mol and based on propylene oxide and/or ethylene oxide,
  (c2) diol having a molecular weight of from 62 g/mol to 499 g/mol,
  (d) water and
  (e) catalysts, the polyols (b) present in the cylindrical molding and comprising (b1) and (b2) having an average polyol molar mass of less than 3900 g/mol.

10 Claims, 1 Drawing Sheet

Figure 1

180 # CYLINDRICAL MOULDINGS BASED ON CELLULAR POLYURETHANE ELASTOMERS

RELATED APPLICATIONS

This application is a national stage application (under 35 U.S.C. §371) of PCT/EP2006/060145, filed Feb. 21, 2006, which claims benefit of German application 10 2005 008 242.4, filed Feb. 22, 2005.

The invention relates to cylindrical, preferably hollow moldings, in particular hollow cylindrical automotive overload springs, preferably for motor vehicle shock absorbers, particularly preferably motor vehicle shock absorbers comprising hollow cylindrical automotive overload springs based on cellular polyurethane elastomers which, if appropriate, may comprise isocyanurate and/or urea structures, having a density according to DIN EN ISO 845 of from 300 to 900 kg/m$^3$, a tensile strength according to DIN EN ISO 1798 of $\geq 2.0$ N/mm$^2$, preferably $\geq 2.5$ N/mm$^2$, an elongation at break according to DIN EN ISO 1798 of $\geq 200\%$, preferably $\geq 350\%$, and a tear propagation resistance according to DIN ISO 34-1 B (b) of $\geq 8$ N/mm and particularly preferably compression set (at 70° C., 40% deformation, 22 hours), based on DIN EN ISO 1856, of less than 20%, the cellular polyurethane elastomer being based on the reaction (i) of a prepolymer having isocyanate groups, preferably having an NCO content of from 1% by weight to 30% by weight, particularly preferably from 6% by weight to 20% by weight, in particular from 13 to 20% by weight, and based on (a) diisocyanatodiphenylmethane (MDI) and
  (b1) at least one polyetherdiol having a molecular weight of from 1500 g/mol to 3000 g/mol and based on propylene oxide and/or ethylene oxide,
with
(ii) a crosslinking component comprising
  (b2) at least one polyetheralcohol having a nominal functionality with respect to isocyanates of from 2 to 3 and a molecular weight of from 1500 g/mol to 6000 g/mol and based on propylene oxide and/or ethylene oxide,
  (c2) diol having a molecular weight of from 62 g/mol to 499 g/mol, preferably butane-1,4-diol and/or ethylene glycol, (d) water and (e) catalysts,
the polyols (b) present in the cylindrical, preferably hollow molding and comprising (b1) and (b2) and, if appropriate, further polyols (b), preferably the polyols (b1) and (b2), having an average polyol molar mass, in particular average polyol molar mass of the polyols (b) present in the moldings and comprising (b1) and (b2) and, if appropriate, further polyols (b), in particular an average polyol molar mass of the polyetherols (b1) and (b2) in g/mol, of less than 3900 g/mol, preferably from 2000 g/mol to 3800 g/mol, particularly preferably from 3000 g/mol to 3700 g/mol, the average polyol molar mass $\overline{M}(Polyol)$ of the polyetherols (b) being calculated according to the following formula:

$$\overline{M}(Polyol) = \frac{(M_{b11} \cdot m_{b11} + \ldots + M_{b1n} \cdot m_{b1n}) \cdot W_p + (M_{b21} \cdot m_{b21} + \ldots + M_{b2n} \cdot m_{b2n}) \cdot W_v}{(m_{b11} + \ldots + m_{b1n}) \cdot W_p + (m_{b21} + \ldots + m_{b2n}) \cdot W_v}$$

having the following meanings:
$\overline{M}(Polyol)$: Average polyol molar mass, in particular average polyol molar mass of the polyols (b) present in the moldings and comprising (b1) and (b2) and, if appropriate, further polyols (b), in particular an average polyol molar mass of the polyetherols (b1) and (b2) in g/mol
$M_{b11}$ (or $M_{b1n}$): Molar mass of polyol b1 (or polyol b1n) in the prepolymer (i) in g/mol
$m_{b11}$ (or $m_{b1n}$): Mass fraction of polyol b11 (or polyol b1n) in the prepolymer (i) in g/g
$W_P$: Mass fraction of the prepolymer (i) in the cylindrical molding, i.e. based on the total mass of prepolymer (i) and crosslinking component (ii), in g/g
$M_{b21}$ (or $M_{b2n}$): Molar mass of polyol b21 (or polyol b2n) in the crosslinking component (ii) in g/mol
$m_{b21}$ (or $M_{b2n}$): Mass fraction of polyol b21 (or polyol b2n) in the crosslinking component (ii) in g/g
$W_V$: Mass fraction of the crosslinking component (ii) in the cylindrical molding, i.e. based on the total mass of the prepolymer (i) and crosslinking component (ii), in g/g.

The molecular weight is preferably the number average molecular weight.

The invention furthermore relates to automobile chassis comprising shock absorbers on whose piston rod a hollow cylindrical molding according to the invention is placed. The invention also relates to processes for the production of cylindrical, preferably hollow moldings based on cellular polyurethane elastomers having a density according to DIN EN ISO 845 of from 300 to 900 kg/m$^3$, a tensile strength according to DIN EN ISO 1798 of $\geq 2$ N/mm$^2$, preferably $\geq 2.5$ N/mm$^2$, an elongation at break according to DIN EN ISO 1798 of $\geq 200\%$, preferably $\geq 350\%$, and a tear propagation resistance according to DIN ISO 34-1 B (b) of $\geq 8$ N/mm and particularly preferably a compression set (at 70° C., 40% deformation, 22 hours), based on DIN EN ISO 1856, of less than 20%, the cellular polyurethane elastomer being based on the reaction (i) of a prepolymer having isocyanate groups, preferably having an NCO content of from 1% by weight to 30% by weight, particularly preferably from 6% by weight to 20% by weight, in particular from 13 to 20% by weight, and based on (a) diisocyanatodiphenylmethane (MDI) and
  (b1) at least one polyetherdiol having a molecular weight of from 1500 g/mol to 3000 g/mol and based on ethylene oxide and/or propylene oxide,
with
(ii) a crosslinking component comprising
  (b2) at least one polyetheralcohol having a nominal functionality with respect to isocyanates of from 2 to 3 and a molecular weight of from 1500 g/mol to 6000 g/mol and based on ethylene oxide and/or propylene oxide,
  (c2) diol having a molecular weight of from 62 g/mol to 499 g/mol, preferably butane-1,4-diol and/or ethylene glycol, (d) water and (e) catalysts,
the polyols (b) present in the cylindrical, preferably hollow molding and comprising (b1) and (b2) and, if appropriate, further polyols (b), preferably the polyols (b1) and (b2), having an average polyol molar mass of less than 3900 g/mol, preferably from 2000 g/mol to 3800 g/mol, particularly preferably from 3000 g/mol to 3700 g/mol, the average polyol molar mass $\overline{M}(Polyol)$ of the polyetherols (b) being calculated according to the following formula:

$$\overline{M}(Polyol) = \frac{(M_{b11} \cdot m_{b11} + \ldots + M_{b1n} \cdot m_{b1n}) \cdot W_p + (M_{b21} \cdot m_{b21} + \ldots + M_{b2n} \cdot m_{b2n}) \cdot W_v}{(m_{b11} + \ldots + m_{b1n}) \cdot W_p + (m_{b21} + \ldots + m_{b2n}) \cdot W_v}$$

having the following meanings:

$\overline{M}$(Polyol): Average polyol molar mass, in particular average polyol molar mass of the polyols (b) present in the moldings and comprising (b1) and (b2) and, if appropriate, further polyols (b), in particular an average polyol molar mass of the polyetherols (b1) and (b2) in g/mol $M_{b11}$ (or $M_{b1n}$): Molar mass of polyol b11 (or polyol b1n) in the prepolymer (i) in g/mol $m_{b11}$ (or $m_{b1n}$): Mass fraction of polyol b11 (or polyol b1n) in the prepolymer (i) in g/g $W_P$: Mass fraction of the prepolymer (i) in the cylindrical molding, i.e. based on the total mass of prepolymer (i) and crosslinking component (ii), in g/g $M_{b21}$ (or $M_{b2n}$): Molar mass of polyol b21 or (polyol b2n) in the crosslinking component (ii) in g/mol $m_{b21}$ (or $m_{b2n}$): Mass fraction of polyol b21 (or polyol b2n) in the crosslinking component (ii) in g/g $W_V$: Mass fraction of the crosslinking component (ii) in the cylindrical molding, i.e. based on the total mass of the prepolymer (i) and crosslinking component (ii), in g/g.

The molecular weight is preferably the number average molecular weight.

Cellular, for example microcellular, polyisocyanate polyadducts, usually polyurethanes and/or polyisocyanurates, which, if appropriate, may comprise urea structures and are obtainable by reacting isocyanates with compounds reactive toward isocyanates, and processes for the preparation, are generally known.

A particular development of these products comprises cellular, in particular microcellular, polyurethane elastomers, which differ from conventional polyurethane foams through their substantially higher density of, usually, from 300 to 900 kg/m³, their particular physical properties and the potential applications resulting therefrom. Such polyurethane elastomers are used, for example, as vibration-damping and shock-absorbing elements, in particular in automotive construction. The suspension elements produced from polyurethane elastomers are pushed onto the piston rod of the shock absorber in automobiles, for example within the total suspension strut construction consisting of shock absorber, coil spring and the elastomer spring.

In use, components of microcellular polyurethane elastomers are exposed in part to elevated temperatures in combination with moisture and the influence of microbes. For this reason, resistance of the materials which is as good as possible under these difficult conditions is to be strived for so that they can meet the high mechanical requirements set for them over as long a period as possible. Temperatures below the glass transition temperature of the cellular polyurethane elastomer lead to a loss of the elastomer properties of the component. For special applications, it is therefore desirable further to improve the low-temperature flexibility of the cellular polyurethane elastomers without adversely affecting the good static and dynamic properties of these materials.

Further requirements which the cellular polyisocyanate polyadducts have to meet consist in the achievement of excellent dynamic-mechanical and static-mechanical properties, for example of excellent tensile strengths, elongations at break, tear propagation resistances and compression sets, so that in particular the polyurethane elastomers can meet the high mechanical requirements which are set for the damping elements over as long a period as possible.

DE-A 36 13 650 and EP-A 178 562 describe the preparation of resilient, compact or cellular polyurethane elastomers. The polyetheresterdiols used as polyol components and prepared from polyoxytetramethylene glycols having molecular weights of from 162 to 10 000 and organic dicarboxylic acids, lead to improved hydrolysis stabilities of the polyurethane elastomers in comparison with the use of pure polyesterpolyols. However, the high price of polyetheresterpolyols according to the invention is disadvantageous. Regarding the low-temperature flexibility of the polyurethane elastomers prepared according to the invention, no information is given in the two patents.

It is generally known that MDI-based and hence economical cellular PU elastomers can be used for damping element applications in an automobile (WO 96/11219). In order to achieve the best possible mechanical properties, polyesterols are usually used as the flexible phase, which results in low stability to hydrolysis in a hot, humid climate ($\geq 80°$ C.). Particularly in the case of damping elements in automotive applications, internal component temperatures above 70° C. are reached owing to the dynamic load. At these increased temperatures, the consistency of the material properties (for example the tensile strength) in a humid warm climate presents a particular challenge.

It was therefore an object of the invention to develop cylindrical, preferably hollow moldings, in particular overload springs, which are used in automobile chassis on piston rods of the shock absorber and which are distinguished by good dynamic and mechanical properties, it being intended in particular that the high level of tensile strength and elongation at break be maintained at as high a level as possible also under humid warm conditions. The moldings, in particular the overload springs, can be capable of being processed economically.

The object can be achieved by the hollow, preferably cylindrical moldings described at the outset.

Through the choice of the isocyanate, i.e. of the MDI, and a polyetherdiol based on ethylene oxide and/or propylene oxide, it was also possible to realize particularly advantageous, low raw material costs in addition to optimization of the property profile described at the outset. The desired spring temper can be achieved by a preferred hard segment fraction of from 30 to 50% by weight. The calculation of the hard segment fraction (% HS) is carried out assuming complete conversion of the polyurethane-forming reactants and complete $CO_2$ exchange, according to the following equation:

$$\% HS = \frac{(m_{MDI} + m_{C1}) \cdot W_p + (m_{C2}) \cdot W_v - (m_{H2O} \cdot W_v \cdot 44/18)}{(m_{MDI} + m_{C1} + m_{b1}) \cdot W_p + (m_{C2} + m_{H2O} + m_{b2}) \cdot W_v} 100$$

% HS: Mass fraction of hard segment in the cylindrical molding, in % by weight $m_{MDI}$: Mass fraction of MDI (a) in the prepolymer (i) in g/g $m_{C1}$: Mass fraction of chain extender (c1) in the prepolymer (i) in g/g $W_P$: Mass fraction of the prepolymer (i) in the cylindrical molding, i.e. based on the total mass of prepolymer (i) and crosslinking component (ii), in g/g $m_{C2}$: Mass fraction of chain extender (c2) in the crosslinking component (ii) in g/g $m_{H2O}$: Mass fraction of water in the crosslinking component (ii) in g/g $W_V$: Mass fraction of the crosslinking component (ii) in the cylindrical molding, i.e. based on the total mass of prepolymer (i) and crosslinking component (ii), in g/g $m_{b1}$: Mass fraction of polyol b1 in the prepolymer (i) in g/g $m_{b2}$: Mass fraction of polyol b2 in the crosslinking component (ii) in g/g In the choice of the polyetherols, the challenge was to choose suitable polyols which give a foam which results in a high mechanical level both under standard conditions of temperature and humidity and in a hot, humid climate and moreover has good low-temperature properties. Surprisingly, the average polyol molar mass $\overline{M}$(Polyol) of the polyetherol (b) proved to be the determining quantity. Average polyol molar masses of less than 3900 g/mol gave foams whose tensile strength had decreased only by about 40% (based on the initial value) even after storage for 70 days in water thermostated at 80° C. (also see examples; for the test conditions, see explanations of table 1). Foams having an average polyol molar mass above 3900 g/mol gave foams whose tensile strengths decreased to a substantially greater extent (by more than 60%, based on the initial value) during the abovementioned storage conditions. With decreasing polyol molar mass, the low-temperature properties generally deteriorate. For the foams according to the invention, comparatively good low-temperature properties were measured (maximum of the loss modulus $G''_{max}=-53°$ C., 1 Hz measuring frequency, heating rate 2° C./min, ISO 6721-7).

Figure 1:
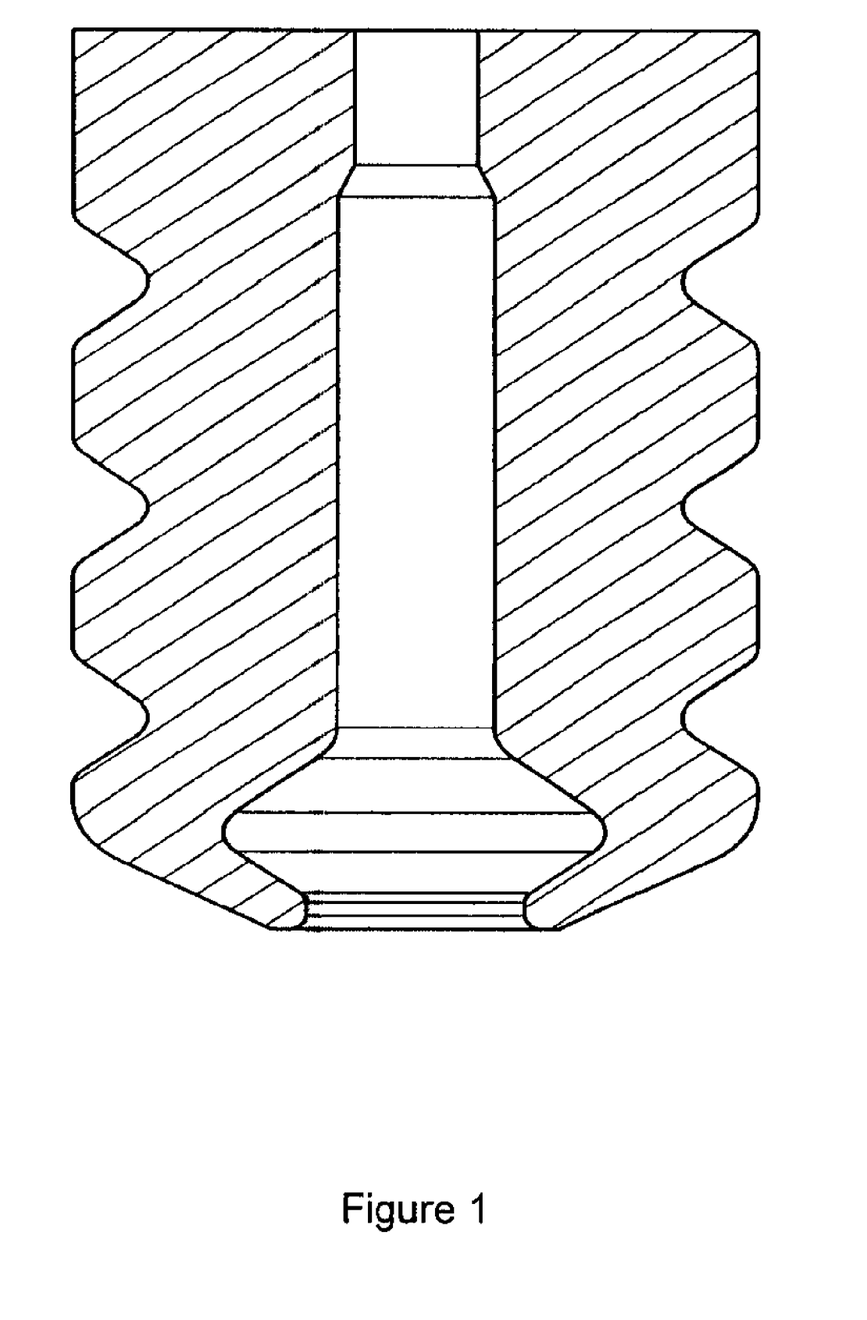
FIG. 1 depicts a spring element.

The expression "cylindrical" is to be understood as meaning not only moldings which have a circular base area and a constant radius over the height, but also moldings which have an oval cross section and/or an oval base area. Moldings in which only sections along the longitudinal axis have a round or oval cross section are by definition also covered by the expression "cylindrical" in this document. Moldings in which the radius varies over the length, i.e. in which the molding has constrictions and/or bulges, are also covered by this term "cylindrical". Cylindrical moldings which have a circular cross section are preferred. An example of a cylindrical overload spring is shown in FIG. 1 in the examples.

In this document, the expression "hollow" moldings is to be understood by definition as meaning those moldings which have a cavity along the longitudinal axis, preferably concentrically along the longitudinal axis. The expression "hollow" is preferably to be understood as meaning that a continuous, preferably concentric cavity is present in the molding, along the total longitudinal axis of the molding.

These preferred forms, i.e. the hollow cylindrical moldings, are generally known as overload springs and are widely used. The production of these moldings in corresponding form has been widely described and is generally known to the person skilled in the art, for example from DE-C 44 38 143.

In the process according to the invention, a prepolymer (i) which has isocyanate groups and preferably has the NCO content described at the outset is reacted with a crosslinking component (ii). The crosslinking component comprises the compounds reactive toward isocyanates, i.e. especially (b2) and preferably (c2) chain extenders and/or crosslinking agents and (d) water, (e) catalysts and, if appropriate, further compounds (b) reactive toward isocyanates and, if appropriate, blowing agents (f) and/or assistants (g). These components which are used are described in detail further below.

The prepolymer is based on the reaction of (a) isocyanate, according to the invention MDI and, if appropriate, further isocyanates, preferably exclusively MDI, with (b1) polyetherdiol and preferably the (c1) diol, preferably glycol. If appropriate, further compounds (b) reactive toward isocyanates and/or (c) can be used in addition to (b1) and preferably (c1).

Initiator substances alkoxylated with ethylene oxide and/or propylene oxide, preferably diols, for example ethylene glycol, propylene glycol, diethylene glycol, dipropylene glycol, triethylene glycol, tripropylene glycol, butane-1,4-diol, hexane-1,6-diol, particularly preferably propylene glycol, can be used according to general processes as (b1) polyetherdiol having a molecular weight of from 1500 g/mol to 3000 g/mol and based on propylene oxide and/or ethylene oxide for the preparation of the prepolymers (i). The polyetherdiols can preferably be propoxylated diols, but it is also possible to use ethoxylated diols or mixed polyetherdiols, it being possible for the alkylene oxide to be arranged blockwise or randomly in the polyetherdiols (b1). As also mentioned further below, if appropriate further polyetheralcohols, for example also polyethermonoalcohols which form in the preparation of the polyetherdiols, can be used in addition to the polyetherdiols (b1). The average actual functionality of the polyetherdiols (b1) used altogether for the preparation of the prepolymer (i) and reactive toward isocyanates is preferably from 1.8 to 2.0.

Diols, preferably diethylene glycol, triethylene glycol, dipropylene glycol and/or triethylene glycol, particularly preferably dipropylene glycol and/or tripropylene glycol, in particular tripropylene glycol, can be used as (c1).

Cylindrical, preferably hollow moldings in which the prepolymer (i) having isocyanate groups is based on the reaction of (a) diisocyanatodiphenylmethane (MDI), (b1) polyetherdiols having a molecular weight of from 1500 g/mol to 3000 g/mol, preferably 2000 g/mol, and based on propylene oxide and/or ethylene oxide and (c1) diol having a molecular weight from 62 g/mol to 499 g/mol, preferably from 106 g/mol to 499 g/mol, preferably diethylene glycol, triethylene glycol, dipropylene glycol and/or triethylene glycol, particularly preferably dipropylene glycol and/or tripropylene glycol, in particular tripropylene glycol (as chain extender (c1)), are therefore preferred.

According to the invention, the crosslinking component (ii) comprises (b2) as a compound reactive toward isocyanates. If appropriate, the crosslinking component (ii) may comprise, in addition to (b2), further compounds (b) which are reactive toward isocyanates and are not covered by the definition (b2), provided that the average polyol molar mass according to the invention is fulfilled over all polyols (b) as a whole. Initiator substances alkoxylated with ethylene oxide and/or propylene oxide, preferably diols and/or triols, for example ethylene glycol, propylene glycol, diethylene glycol, dipropylene glycol, triethylene glycol, tripropylene glycol, butane-1,4-diol, hexane-1,6-diol, glycerol, trimethylolpropane, preferably propylene glycol and glycerol, may be used as (b2) polyetheralcohols having a nominal functionality with respect to isocyanates of from 2 to 3, i.e. preferably having nominally 2 or 3 hydroxyl groups and a molecular weight of from 1500 g/mol to 6000 g/mol and based on propylene oxide and/or ethylene oxide, for the preparation of the crosslinking component (ii) by generally known processes. The polyetherdiols and/or polyethertriols may be propoxylated diols and/or triols, and it is also possible to use ethoxylated diols and/or triols or mixed polyetherdiols and/or polyethertriols, it being possible for the alkylene oxide to be arranged blockwise or randomly in the polyetheralcohol. The expression "nominal" with regard the functionality with respect to isocyanates is to be understood as meaning that the initiator substance for the preparation of the polyetheralcohols has this number of functions reactive toward isocyanates, preferably hydroxyl groups. As result of the alkoxylation of the initiator substance, the actual average functionality of the polyetheralcohols is usually lower. Alternatively or in addition to the feature "nominal functionality", it is also possible to state the average actual functionality, which, in the present case, is preferably from 1.6 to 2.9. The polyetheralcohols (b2) may be a mixture of polyetheralcohols, the mixture having the characteristics according to the invention (e.g. functionality of from 2 to 3 and molecular weight of from 1500 to 6000 g/mol). (b2) preferably has terminal ethylene oxide units.

Generally known diols having corresponding molecular weight, for example ethylene glycol, propylene glycol, diethylene glycol, dipropylene glycol, triethylene glycol, tripropylene glycol, butane-1,4-diol, hexane-1,6-diol, preferably butane-1,4-diol and/or ethylene glycol, can be used as (c2) diols, i.e. as chain extenders preferably having a molecular weight of from 62 g/mol to 499 g/mol, for the preparation of the crosslinking component (ii).

Preferably hollow cylindrical moldings in which the crosslinking component (ii) comprises heptane, n-pentane, 2-methylbutane and/or cyclopentane as, preferably, physical blowing agent (f) are particularly preferred. As a result of the additional blowing effect (in addition to the water (d) according to the invention), it is ensured that even overload springs and/or moldings having a complex shape and densities from 300 to 450 g/l are uniformly foamed.

The cylindrical, preferably hollow moldings according to the invention preferably have a height of from 25 mm to 1000 mm, particularly preferably from 25 mm to 200 mm, a maximum external diameter of from 40 mm to 700 mm, particularly preferably from 40 mm to 150 mm, and a minimum diameter of the cavity of from 0 mm to 90 mm, particularly preferably from 8 mm to 35 mm.

The cylindrical, preferably hollow moldings according to the invention preferably have a glass transition temperature of less than −33° C., particularly preferably less than −40° C. (ISO 6721-7, 1 Hz measuring frequency, heating rate 2° C./min, maximum of the loss modulus $G''_{max}$).

The cylindrical, preferably hollow moldings according to the invention preferably have a Shore A surface hardness, according to DIN 53505-A, of from 30 to 80, preferably from 40 to 65, at a density of 500 g/l.

The cylindrical, preferably hollow moldings according to the invention, also referred to below as "moldings", are used as damping elements in vehicle construction, for example in automotive construction, for example as overload springs, buffers, transverse link bearings, rear axle subframe bearings, stabilizer bearings, longitudinal strut bearings, suspension strut bearings, shock absorber bearings, bearings for wishbones and/or as an emergency wheel which is present on the rim and, for example in the event of tire damage, ensures that the vehicle travels on the cellular polyisocyanate polyadduct and remains steerable.

The moldings according to the invention, i.e. the cellular polyisocyanate polyadducts, preferably the microcellular polyurethane elastomers, accordingly have not only excellent mechanical and dynamic properties; in particular the stability in a humid, warm climate could be substantially improved according to the invention, in combination with good low-temperature flexibility. In particular, this combination of particularly advantageous properties could not be achieved to date in this form.

The process according to the invention for the production of the moldings according to the invention is effected according to the invention as described at the outset by a procedure in which, in a mold, (i) a prepolymer having isocyanate groups, preferably having an NCO content of from 1% by weight to 30% by weight, particularly preferably from 6% by weight to 20% by weight, in particular from 13 to 20% by weight, and based on (a) diisocyanatodiphenylmethane (MDI) and
  (b1) at least one polyetherdiol having a molecular weight of from 1500 g/mol to 3000 g/mol and based on ethylene oxide and/or propylene oxide is reacted with
(ii) a crosslinking component comprising
  (b2) polyetheralcohols having a nominal functionality with respect to isocyanates of from 2 to 3 and a molecular weight of from 1500 g/mol to 6000 g/mol and based on ethylene oxide and/or propylene oxide,
  (c2) diol having a molecular weight of from 62 g/mol to 499 g/mol, preferably butane-1,4-diol and/or ethylene glycol, (d) water and (e) catalysts, the polyols (b) present in the cylindrical, preferably hollow molding comprising (b1) and (b2) and, if appropriate, further polyols (b), preferably the polyols (b1) and (b2), have an average polyol molar mass of less than 3900 g/mol, preferably from 2000 g/mol to 3800 g/mol, particularly preferably from 3000 g/mol to 3700 g/mol, the average polyol molar mass $\overline{M}(Polyol)$ being calculated according to the following formula:

$$\overline{M}(Polyol) = \frac{(M_{b11} \cdot m_{b11} + \ldots + M_{b1n} \cdot m_{b1n}) \cdot W_p + (M_{b21} \cdot m_{b21} + \ldots + M_{b2n} \cdot m_{b2n}) \cdot W_v}{(m_{b11} + \ldots + m_{b1n}) \cdot W_p + (m_{b21} + \ldots + m_{b2n}) \cdot W_v}$$

having the following meanings:

$\overline{M}(Polyol)$: Average polyol molar mass, in particular average polyol molar mass of the polyols (b) present in the moldings and comprising (b1) and (b2) and, if appropriate, further polyols (b), in particular average polyol molar mass of the polyetherols (b1) and (b2), in g/mol $M_{b11}$ (or $M_{b1n}$): Molar mass of polyol b11 (or polyol b1n) in the prepolymer (i) in g/mol $m_{b11}$ (or $m_{b1n}$): Mass fraction of polyol b11 (or polyol b1n) in the prepolymer (i) in g/g $W_P$: Mass fraction of the prepolymer (i) in the cylindrical molding, i.e. based on the total mass of prepolymer (i) and crosslinking component (ii), in g/g $M_{b21}$ (or $M_{b2n}$): Molar mass of polyol b21 (or polyol b2n) in the crosslinking component (ii), in g/mol $m_{b21}$ (or $m_{b2n}$): Mass fraction of polyol b21 (or polyol b2n) in the crosslinking component (ii) in g/g $W_V$: Mass fraction of the crosslinking component (ii) in the cylindrical molding, i.e. based on the total mass of prepolymer (i) and crosslinking component (ii), in g/g.

The molecular weight is preferably the number average molecular weight.

In a two-stage process, the prepolymer (i) having isocyanate groups is preferably prepared in the first stage by reacting (a) diisocyanatodiphenylmethane (MDI) with (b1) at least one polyetherdiol having a molecular weight of from 1500 g/mol to 3000 g/mol and based on ethylene oxide and/or propylene oxide, and (c1) at least one diol, preferably glycol, preferably dipropylene glycol and/or tripropylene glycol, in particular tripropylene glycol, and this prepolymer (i) is reacted in the second stage in a mold with the crosslinking component (ii).

The prepolymer (i) is preferably based on diisocyanatodiphenylmethane (MDI) and isocyanates which have carbodiimide structures and/or uretonimine structures.

As already described, the crosslinking component may preferably comprise n-pentane, 2-methylbutane and/or cyclopentane as blowing agent (f), preferably in addition to the water.

It may be particularly advantageous, precisely for the production of the moldings according to the invention, in particular of the overload springs, if, after removal from the mold, the cylindrical moldings are annealed, i.e. heated, at a temperature of from 80° C. to 130° C. for a duration of from 3 to 48 hours. As a result of this, the compression set based on DIN EN ISO 1856 (at 70° C., 40% deformation, 22 hours) can be reduced.

The production of the shaped articles is carried out at an NCO/OH ratio of from 0.85 to 1.2 (=index). The heated starting components are preferably mixed and are introduced, in an amount corresponding to the desired density of the shaped article, into a heated, preferably tightly sealing mold.

The shaped articles have usually cured after from 5 to 20 minutes and can therefore be removed from the mold.

The amount of the reaction mixture introduced into the mold is preferably such that the moldings obtained have the density described above. The cellular polyisocyanate polyadducts obtainable according to the invention preferably have a density, according to DIN EN ISO 845, of from 300 to 900 kg/m$^3$, particularly preferably from 300 to 600 kg/m$^3$.

The starting components are usually introduced into the mold at a temperature of from 20 to 80° C., preferably from 30 to 70° C. The degrees of compression for the production of the moldings are from 1.1 to 5, preferably from 1.5 to 4.

The cellular polyisocyanate polyadducts according to the invention are expediently prepared by the one-shot process with the aid of the low pressure technique or in particular the known reaction injection molding (RIM) technique. The reaction is carried out in particular with compression in a closed mold.

With the use of a mixing chamber having a plurality of feed nozzles, the starting components can be fed in individually and thoroughly mixed in the mixing chamber. It has proven advantageous to employ the two-component process.

According to a particularly advantageous embodiment, in a two-stage process, a prepolymer (i) containing NCO groups is first prepared and is then reacted by means of the high pressure or low pressure technique with a crosslinking component (ii) in the mold.

The preparation of the prepolymer (i) can preferably be effected by reacting the polyetherdiol as (b1) based on propylene oxide and/or ethylene oxide and, if appropriate, the diol as (c1) with the MDI as (a) in excess, usually at temperatures of from 70° C. to 100° C., preferably from 70° C. to 90° C. The reaction time is tailored so that the theoretical NCO content is reached.

As described above, the preparation, according to the invention, of the moldings is preferably effected in a two-stage process in which a prepolymer (i) having isocyanate groups is prepared in the first stage by reacting (a) with (b1) and, if appropriate, (c1) and this prepolymer (i) is reacted with a crosslinking component (ii) comprising polyetherol (b2), diol (c2) and water (d) in the second stage in a mold, catalysts (e) and, if appropriate, blowing agents (f) and/or assistants (g) being present in the prepolymer and/or in the crosslinking component, preferably in the crosslinking component (ii).

In order to improve the demolding of the moldings produced according to the invention, it has proven advantageous to coat the inner surfaces of the mold, at least at the beginning of a production series, with conventional external lubricants, for example with aqueous wax-based or in particular silicone-based soap solutions.

The demolding times are on average from 5 to 20 minutes, depending on the size and geometry of the shaped article.

After the production of the shaped articles in the mold, the shaped articles can preferably be annealed, i.e. heated, for a duration of from 3 to 48 hours at a temperature of from 80° C. to 130° C.

Regarding the starting components which the reaction mixture according to the invention comprises, the following may be stated:

According to the invention, diphenylmethane 2,2'-, 2,4'- and/or 4,4'-diisocyanate (MDI), for example MDI comprising from 75 to 85% by weight, preferably 80% by weight, of methylenediphenyl 4,4'-diisocyanate, and from 15% by weight to 25% by weight, preferably 20% by weight, of methylenediphenyl 2,4'-diisocyanate, is used as isocyanate (a). The MDI can, if appropriate, be used in modified form. If appropriate, further, generally known (cyclo)aliphatic and/or aromatic polyisocyanates can be used in addition to the MDI. Aromatic diisocyanates, preferably naphthylene 1,5-diisocyanate (NDI), toluene 2,4- and/or 2,6-diisocyanate (TDI), dimethyldiphenyl 3,3'-diisocyanate, diphenylethane 1,2-diisocyanate or p-phenylene diisocyanate, and/or (cyclo)aliphatic isocyanates, such as, for example, hexamethylene 1,6-diisocyanate or 1-isocyanato-3,3,5-trimethyl-5-isocyanatomethylcyclohexane, and/or polyisocyanates, such as, for example, polyphenylpolymethylene polyisocyanates, are particularly suitable. The isocyanates can be used in the form of the pure compound, in mixtures and/or in modified form, for example in the form of uretdiones, isocyanurates, allophanates and biurets, preferably in the form of reaction products comprising urethane and isocyanate groups, i.e. isocyanate prepolymers.

As compounds (b) reactive toward isocyanates, the polyetheralcohols (b1) described above are used in the prepolymer (i) and (b2) in the crosslinking component (ii). These can, if appropriate, be used together with the generally known polyhydroxy compounds, preferably polyetheralcohols and/or polyesteralcohols, particularly preferably polyetheralcohols, preferably those having a functionality with respect to isocyanate groups of from 2 to 3 and preferably a molecular weight of from 1500 to 6000 g/mol. The amount by weight of the polyetherdiols (b1) having a molecular weight of from 1500 g/mol to 3000 g/mol and based on propylene oxide and/or ethylene oxide, relative to the total weight of the compounds (b) used for the preparation of the prepolymer (i) and reactive toward isocyanates, is preferably at least 70% by weight, particularly preferably at least 80% by weight, in particular at least 90% by weight, based in each case on the total weight of the compounds (b) used for the preparation of the prepolymer and reactive toward isocyanates. The amount by weight of the polyetheralcohols (b2) having a nominal functionality with respect to isocyanates of from 2 to 3 and a molecular weight of from 1500 g/mol to 6000 g/mol and based on propylene oxide and/or ethylene oxide, relative to the total weight of the compounds (b) used in the crosslinking component (ii) and reactive toward isocyanates, is preferably at least 60% by weight, particularly preferably at least 70% by weight, in particular at least 80% by weight, based in each case on the total weight of the compounds (b) reactive toward isocyanates in the crosslinking component (ii). Particularly preferably, exclusively the polyetheralcohols (b1) and (b2) according to the invention are used as component (b). As described above, the polyetheralcohols (b1) and (b2) may be in each case mixtures of polyetheralcohols, the respective mixture having the respective characteristics according to the invention (e.g. functionality, molecular weight).

In addition to the above-described components (c1) and (c2) reactive toward isocyanates, chain extenders and/or crosslinking agents (c) having a molecular weight of less than 500 g/mol, preferably from 62 g/mol to 499 g/mol, can furthermore be used, for example selected from the group consisting of the di- and/or trifunctional alcohols, di- to tetrafunctional polyoxyalkylenepolyols and the alkyl-substituted aromatic diamines or of mixtures of at least two of said chain extenders and/or crosslinking agents. For example, alkanediols having 2 to 12, preferably 2, 4 or 6, carbon atoms can be used as (c), e.g. ethane-1,3-propane-, 1,5-pentane-, 1,6-hexane-, 1,7-heptane-, 1,8-octane-, 1,9-nonane- or 1,10-decanediol and preferably 1,4-butanediol, dialkylene glycols having 4 to 8 carbon atoms, such as, for example, diethylene glycol and dipropylene glycol, and/or di- to tetrafunctional polyoxyalkylenepolyols. However, branched and/or unsaturated alkanediols having, usually, not more than 12 carbon atoms, such as, for example, 1,2-propanediol, 2-methyl-, 2,2-dimethylpropane-1,3-diol, 2-butyl-2-ethylpropane-1,3-diol, but-2-ene-1,4-diol and but-2-yne-1,4-diol, diesters of terephthalic acid with glycols having 2 to 4 carbon atoms, such as, for example, bisethylene glycol or 1,4-butanediol terephthalate, hydroxyalkylene ethers of hydroquinone or of resorcinol, such as, for example, 1,4-di(b-hydroxyethyl)-hydroquinone or 1,3-di(b-hydroxyethyl(resorcinol), alkanolamines having 2 to 12 carbon atoms, such as, for example, ethanolamine, 2-aminopropanol and 3-amino-2,2-dimethylpropanol, N-alkyldialkanolamines, such as, for example, N-methyl- and N-ethyldiethanolamine are also suitable. For example, trifunctional alcohols and alcohols having a higher functionality, such as, for example, glycerol, trimethylolpropane, pentaerythritol and trihydroxycyclohexanes, and trialkanolamines, such as, for example, triethanolamine, may be mentioned as crosslinking agents (c) having a higher functionality. Chain extenders which have proven excellent and are therefore preferably used are alkyl-substituted aromatic polyamines having molecular weights of, preferably, from 122 to 400, in particular primary aromatic diamines which have, in the ortho-position relative to the amino groups, at least one alkyl substituent which reduces the reactivity of the amino group by steric hindrance, which are liquid at room temperature and are at least partly, but preferably completely, miscible with the higher molecular weight, preferably at least difunctional compounds (b) under the process conditions. For the preparation of the moldings according to the invention, the industrially readily obtainable 1,3,5-triethyl-2,4-phenylenediamine, 1-methyl-3,5-diethyl-2,4-phenylenediamine, mixtures of 1-methyl-3,5-diethyl-2,4- and -2,6-phenylenediamines, i.e. DETDA, isomer mixtures of 3,3'-di- or 3,3',5,5'-tetraalkyl-substituted 4,4'-diaminodiphenylmethanes having 1 to 4 carbon atoms in the alkyl radical, in particular 3,3',5,5'-tetraalkyl-substituted 4,4'-diaminodiphenylmethane comprising methyl, ethyl and isopropyl radicals, in bound form, and mixtures of said tetraalkyl-substituted 4,4'-diaminodiphenylmethanes and DETDA can be used. For achieving special mechanical properties, it may also be expedient to use the alkyl-substituted aromatic polyamines as a mixture with the abovementioned low molecular weight polyhydric alcohols, preferably dihydric and/or trihydric alcohols or dialkylene glycols.

According to the invention, the preparation of the cellular polyisocyanate polyadducts is preferably carried out in the presence of water (d). The water acts both as a crosslinking agent with formation of urea groups and, owing to the reaction with diisocyanate groups with formation of carbon dioxide, as a blowing agent. Owing to this dual function, it is mentioned in this document separately from (c) and (f). By definition, the components (c) and (f) thus comprise no water which by definition is exclusively mentioned as (d). The amounts of water which can expediently be used are from 0.01 to 3% by weight, preferably from 0.1 to 0.6% by weight, based on the weight of the crosslinking component (ii).

For accelerating the reaction, generally known catalysts (e) can be added to the reaction batch both in the preparation of a prepolymer and, if appropriate, in the reaction of a prepolymer with a crosslinking component. The catalysts (e) can be added individually and also as a mixture with one another. These are preferably organometallic compounds, such as tin (II) compounds or tin(IV) compounds of organic carboxylic acids, e.g. tin(II) dioctanoate, tin(II) dilaurate, dibutyltin diacetate, dibutyltin dilaurate, di-n-octyltin(IV) bis(2-ethylhexylthioglycolate) and n-octyltin(IV) tris(2-ethylhexylthioglycolate), and tertiary amines, such as tetramethylethylenediamine, N-methylmorpholine, diethylbenzylamine, triethylamine, dimethylcyclohexylamine, diazabicyclooctane, N,N'-dimethylpiperazine, N-methyl, N'-(4-N-dimethylamino-)butylpiperazine, N,N,N',N",N"-pentamethyldiethylenediamine or the like. The following are furthermore suitable as catalysts: amidines, such as, for example, 2,3-dimethyl-3,4,5,6-tetrahydropyrimidine, tris(dialkylaminoalkyl)-s-hexahydrotriazines, in particular tris(N,N-dimethylaminopropyl)-s-hexahydrotriazine, tetraalkylammonium hydroxides, such as, for example, tetramethylammonium hydroxide, alkali metal hydroxides, such as, for example, sodium hydroxide, and alkali metal alcoholates, such as, for example, sodium methylate and potassium isopropylate, and alkali metal salts of long-chain fatty acids having 10 to 20 carbon atoms and, if appropriate, OH side groups. Depending on the reactivity to be established, the catalysts (e) are used in amounts of from 0.001 to 0.5% by weight, based on the crosslinking component (ii).

If appropriate, conventional blowing agents (f) can be used in the polyurethane preparation. For example, low-boiling liquids which vaporize under the influence of the exothermic polyaddition reaction are suitable. Liquids which are inert to the organic polyisocyanate and have boiling points below 100° C. are suitable. Examples of such preferably used liquids are halogenated, preferably fluorinated, hydrocarbons, such as, for example, methylene chloride and dichloromonofluoromethane, perfluorinated or partly fluorinated hydrocarbons, such as, for example, trifluoromethane, difluoromethane, difluoroethane, tetrafluoroethane and heptafluoropropane, carbon dioxide, hydrocarbons, such as, for example, n-butane and isobutane, n-pentane and isopentane and the industrial mixtures of these hydrocarbons, propane, propylene, hexane, heptane, cyclobutane, cyclopentane and cyclohexane, dialkyl ethers, such as, for example, dimethyl ether, diethyl ether and furan, carboxylic esters, such as, for example, methyl and ethyl formate, ketones, such as, for example, acetone, and/or fluorinated and/or perfluorinated, tertiary alkylamines, such as, for example, perfluorodimethylisopropylamine. Mixtures of these low-boiling liquids with one another and/or with other substituted or unsubstituted hydrocarbons may also be used. n-Pentane and/or isopentane and/or cyclopentane are preferably used as blowing agent (f). The most expedient amount of low-boiling liquids for the preparation of such cellular resilient moldings from elastomers comprising urethane and urea groups depends on the density which it is intended to achieve and on the amount of the water (d) according to the invention. In general, amounts of from 0.5 to 10% by weight, preferably from 1 to 5% by weight, based on the weight of the crosslinking component (ii), give satisfactory results. Particularly preferably, exclusively water (d) is used as the blowing agent, particularly if the components (i) and (ii) are introduced into the mold by means of a high pressure machine. If the shaped articles according to the invention are produced by means of the low pressure technique, physical blowing agents, preferably carbon dioxide, n-pentane, 2-methylbutane and/or cyclopentane, are preferably used in addition to the water. If appropriate, encapsulated physical blowing agents which are sold, for example, under the brand Expancell can also be used as blowing agents.

Assistants (g) can be used in the production, according to the invention, of the shaped articles. These include, for example, generally known surface-active substances, foam stabilizers, cell regulators, fillers, flameproofing agents, nucleating agents, antioxidants, stabilizers, lubricants and mold release agents, dyes and pigments. Suitable surface-active substances are, for example, compounds which serve for promoting the homogenization of the starting materials and, if appropriate, are also suitable for regulating the cell structure. Emulsifiers, such as, for example, the sodium salts of castor oil sulfates or of fatty acids and salts of fatty acids with amines, for example of oleic acid with diethylamine, of stearic acid with diethanolamine, of ricinoleic acid with diethanolamine, salts of sulfonic acids, for example alkali metal and ammonium salts of dodecylbenzene- and dinaphthylmethanedisulfonic acid and ricinoleic acid; foam stabilizers, such as siloxane/oxyalkylene copolymers and other organosiloxanes, oxyethylated alkylphenols, oxyethylated fatty alcohols, liquid paraffins, castor oil esters or ricinoleic acid esters, turkey red oil and peanut oil, and cell regulators, such as paraffins, fatty alcohols and dimethylpolysiloxanes, may be mentioned by way of example. Oligomeric polyacrylates having polyoxyalkylene and fluoroalkane radicals as side groups are furthermore suitable for improving the emulsifying effect, the cell structure and/or the stabilization thereof. The surface-active substances are usually used in amounts of from 0.01 to 5 parts by weight, based on 100 parts by weight of crosslinking component (ii).

Fillers, in particular reinforcing fillers, are to be understood as meaning the conventional organic or inorganic fillers, reinforcing agents and extenders known per se. The following may be mentioned specifically by way of example: inorganic fillers, such as silicate minerals, for example sheet silicates, such as antigorite, serpentine, hornblends, amphiboles, chrysotile, talc; metal oxides, such as kaolin, aluminas, aluminum silicate, titanium oxides and iron oxides, metal salts, such as chalk, barite and inorganic pigments, such as cadmium sulfide, zinc sulfide and glass particles. Examples of suitable organic fillers are: carbon black, melamine, expanded graphite, rosin, cyclopentadienyl resins and graft polymers. Preferably used reinforcing fillers are fibers, for example carbon fibers or glass fibers, particularly when high heat distortion resistance or very high rigidity is required, it being possible for the fibers to be treated with adhesion promoters and/or sizes. The inorganic and organic fillers can be used individually or as mixtures and are incorporated into the crosslinking component (ii) usually in amounts of from 0.5 to 50% by weight, preferably from 1 to 20% by weight.

Suitable flameproofing agents are, for example, tricresyl phosphate, tris(2-chloroethyl)phosphate, tris(2-chloropropyl)phosphate, tris(1,3-dichloropropyl)phosphate, tris(2,3-dibromopropyl)phosphate and tetrakis(2-chloroethyl)ethylene diphosphate. In addition to the abovementioned halogen-substituted phosphates, inorganic flameproofing agents, such as red phosphorus, aluminum hydroxide, antimony trioxide, arsenic trioxide, ammonium polyphosphate and calcium sulfate, or cyanuric acid derivatives, such as, for example, melamine, or mixtures of at least two flameproofing agents, such as, for example, ammonium phosphates and melamine, and, if appropriate, starch and/or expanded graphite can be used for flameproofing the cellular PU elastomers prepared according to the invention. In general, it has proven expedient to use from 1 to 10% by weight in the cylindrical molding.

For example, talc, calcium fluoride, sodium phenylphosphinate, alumina and finely divided polytetrafluoroethylene can be used as nucleating agents in amounts of up to 5% by weight, based on the total weight of the cylindrical molding.

Suitable antioxidants and heat stabilizers which can be added to the cellular PU elastomers according to the invention are, for example, halides of metals of group I of the Periodic Table of the Elements, for example sodium, potassium and lithium halides, if appropriate in combination with copper(I) halides, for example chlorides, bromides or iodides, sterically hindered phenols, hydroquinones and substituted compounds of these groups and mixtures thereof, which are preferably used in concentrations of up to 1% by weight, based on the total weight of the cylindrical molding.

Lubricants and mold release agents, which as a rule, are likewise added in amounts of up to 1% by weight, based on the total weight of the cylindrical molding, are stearic acid, stearyl alcohol, stearic acid esters and amides and the fatty acid esters of pentaerythritol. Furthermore, organic dyes, such as nigrosine, and pigments, such as, for example, titanium dioxide, cadmium sulfide, cadmium sulfide selenide, phthalocyanines, ultramarine blue or carbon black, can furthermore be added.

Further information regarding the abovementioned other conventional assistants and additives appears in the technical literature.

The invention is to be explained in more detail by the following examples.

For optimum comparability, all example formulations were foamed with the same index 0.98 and the same average polyol functionality of 2.0. The static mechanical properties were determined from blocks, and the dynamic mechanical properties from spring elements (cf. FIG. 1).

EXAMPLE 1

According to the Invention ($\overline{M}$(Polyol): 3600 g/mol)

1) Preparation of the Prepolymer Containing NCO Groups
   61.5 parts by weight of 4,4'-diisocyanatodiphenylmethane (Lupranat® MES from BASF Aktiengesellschaft) and 2 parts by weight of uretonimine-modified MDI (Lupranat® MM 103 from BASF Aktiengesellschaft) were melted under a nitrogen atmosphere in a three-necked flask, and a mixture of 4 parts by weight of tripropylene glycol and 32.5 parts by weight of a polypropylene oxide (propylene glycol as initiator molecule, hydroxyl number of 56 mg KOH/g, molecular weight 1970 g/mol) was added at 80° C. with stirring. The mixture was heated to 80° C. for 1 hour for complete conversion and then cooled. A virtually colorless liquid having an NCO content of 17.9% and a viscosity of 800 mPa·s at 25° C. resulted. The liquid had a shelf life of several weeks at room temperature.
2) Preparation of the Crosslinking Component
   46 parts by weight of polyoxypropylene (80% by weight)-polyoxyethylene (20% by weight) glycol having a hydroxyl number of 29 mg KOH/g and a molecular weight of 3410 g/mol, prepared using propylene glycol as an initiator molecule
   37.6 parts by weight of polyoxypropylene (80% by weight)-polyoxyethylene (20% by weight) glycol having a hydroxyl number of 27 mg KOH/g and a molecular weight of 5180 g/mol, prepared using glycerol as an initiator molecule
   12.2 parts by weight of 1,4-butanediol
   0.3 part by weight of water 0.1 part by weight of di-n-octyltin bis(2-ethylhexylthioglycolate)
0.3 part by weight of silicone-based foam stabilizer (DC 193 from Dow Corning)
1.9 parts by weight of a mixture of Lupragen® N 203 (BASF Aktiengesellschaft) and Niax® catalyst E-A-1 (GE Silicones), catalysts
1.6 parts by weight of cyclopentane 3) Production of the Cylindrical Moldings 100 parts by weight of the prepolymer according to (1) were mixed with 114 parts by weight of the crosslinking component according to (2) with the aid of a low pressure casting machine at a component temperature of 30° C., the mixture was introduced into a closable mold thermostated at 55° C. (for example having the spring geometry according to FIG. 1) and the foam was cured at 55° C. for 12 min. After demolding of the microcellular product, the shaped article was thermally postcured for 14 h at 95° C.

EXAMPLE 2

According to the Invention ($\overline{M}$(Polyol): 3300 g/mol)

1) Preparation of the Prepolymer Containing NCO Groups 54 parts by weight of 4,4'-diisocyanatodiphenylmethane (Lupranat® MES from BASF Aktiengesellschaft) and 2 parts by weight of uretonimine-modified MDI (Lupranat® MM 103 from BASF Aktiengesellschaft) were melted under a nitrogen atmosphere in a three-necked flask, and a mixture of 2 parts by weight of tripropylene glycol and 42 parts by weight of a polypropylene oxide (Acclaim™ polyol 2200 from Bayer AG, hydroxyl number of 56 mg KOH/g, molecular weight 2000 g/mol) was added at 80° C. with stirring. The mixture was heated to 80° C. for 1 hour for complete conversion and then cooled. A virtually colorless liquid having an NCO content of 15.8% resulted. The liquid had a shelf life of several weeks at room temperature.

2) Preparation of the Crosslinking Component 53.0 parts by weight of polyoxypropylene (80% by weight)-polyoxyethylene (20% by weight) glycol having a hydroxyl number of 29 mg KOH/g and a molecular weight of 3410 g/mol, prepared using propylene glycol as an initiator molecule
28.2 parts by weight of polyoxypropylene (80% by weight)-polyoxyethylene (20% by weight) glycol having a hydroxyl number of 27 mg KOH/g and a molecular weight of 5180 g/mol, prepared using glycerol as an initiator molecule
14.1 parts by weight of 1,4-butanediol
0.4 part by weight of water
0.1 part by weight of di-n-octyltin bis(2-ethylhexylthioglycolate)
0.3 part by weight of silicone-based foam stabilizer (DC 193 from Dow Corning)
2.3 parts by weight of a mixture of Lupragen® N 203 and Niax® catalyst E-A-1 (GE Silicones)
1.6 parts by weight of cyclopentane 3) Production of the Cylindrical Molding 100 parts by weight of the prepolymer were thoroughly mixed with 86 parts by weight of crosslinking component at 23° C. and the mixture was introduced into a closable mold thermostated at 55° C. and the foam was cured at 55° C. for 12 min. After demolding of the microcellular product, the shaped article was thermally postcured for 14 h at from 95 to 110° C.

COMPARATIVE EXAMPLE 1

$\overline{M}$(Polyol): 4100 g/mol

1) Preparation of the Prepolymer Containing NCO Groups 44 parts by weight of 4,4'-diisocyanatodiphenylmethane (Lupranat® MES from BASF Aktiengesellschaft) and 2.6 parts by weight of uretonimine-modified MDI (Lupranat® MM 103 from BASF Aktiengesellschaft) were melted under a nitrogen atmosphere in a three-necked flask, and a mixture of 1 part by weight of dipropylene glycol and 52.4 parts by weight of a polyoxypropylene (80% by weight)-polyoxyethylene (20% by weight) glycol (propylene glycol as initiator molecule, hydroxyl number of 29 mg KOH/g, molecular weight 3410 g/mol) was added at 80° C. with stirring. The mixture was heated to 80° C. for 1 hour for complete conversion and then cooled. A virtually colorless liquid having an NCO content of 13.9% resulted. The liquid had a shelf life of several weeks at room temperature.

2) Preparation of the Crosslinking Component 24.7 parts by weight of polyoxypropylene (80% by weight)-polyoxyethylene (20% by weight) glycol having a hydroxyl number of 29 mg KOH/g and a molecular weight of 3410 g/mol, prepared using propylene glycol as an initiator molecule
55.6 parts by weight of polyoxypropylene (80% by weight)-polyoxyethylene (20% by weight) glycol having a hydroxyl number of 27 mg KOH/g and a molecular weight of 5180 g/mol, prepared using glycerol as an initiator molecule
14.2 parts by weight of 1,4-butanediol
0.3 part by weight of water
0.1 part by weight of di-n-octyltin bis(2-ethylhexylthioglycolate)
0.3 part by weight of silicone-based foam stabilizer (DC 193 from Dow Corning)
1.9 parts by weight of a mixture of Lupragen® N 203 and Niax® catalyst E-A-1 (GE Silicones)
2.9 parts by weight of cyclopentane 3) Production of the Cylindrical Molding 100 parts by weight of the prepolymer were mixed with 81 parts by weight of crosslinking component with the aid of a low pressure casting machine at the component temperature of 30° C., the mixture was introduced into a closable mold thermostated at 55° C. and the foam was cured at 55° C. for 12 min. After demolding of the microcellular product, the shaped article was thermally postcured for 14 h at 95° C.

COMPARATIVE EXAMPLE 2

$\overline{M}$(Polyol): 4000 g/mol

1) Preparation of the Prepolymer Containing NCO Groups

PREPOLYMER OF EXAMPLE 3

2) Preparation of the Crosslinking Component 24.1 parts by weight of polyoxypropylene (80% by weight)-polyoxyethylene (20% by weight) glycol having a hydroxyl number of 29 mg KOH/g and a molecular weight of 3410 g/mol, prepared using propylene glycol as an initiator molecule 52.7 parts by weight of polyoxypropylene (80% by weight)-polyoxyethylene (20% by weight) glycol having a hydroxyl number of 27 mg KOH/g and a molecular weight of 5180 g/mol, prepared using glycerol as an initiator molecule 9.2 parts by weight of ethylene glycol 8.6 parts by weight of diethylene glycol 0.3 part by weight of water 0.1 part by weight of di-n-octyltin bis(2-ethylhexylthioglycolate)

0.3 part by weight of silicone-based foam stabilizer (DC 193 from Dow Corning)

1.8 parts by weight of a mixture of Lupragen® N 203 and Niax® catalyst E-A-1 (GE Silicones)

2.9 parts by weight of cyclopentane

3) Production of the Cylindrical Molding 100 parts by weight of the prepolymer were mixed with 62 parts by weight of crosslinking component with the aid of a low pressure casting machine at the component temperature of 30° C., the mixture was introduced into a closable mold thermostated at 55° C. and the foam was cured at 55° C. for 12 min. After demolding of the microcellular product, the shaped article was thermally postcured for 14 h at 95° C.

COMPARATIVE EXAMPLE 3

$\overline{M}$(Polyol): 4000 g/mol

1) Preparation of the Prepolymer Containing NCO Groups 44.4 parts by weight of 4,4'-diisocyanatodiphenylmethane (Lupranat® MES from BASF Aktiengesellschaft) and 2 parts by weight of uretonimine-modified MDI (Lupranat® MM 103 from BASF Aktiengesellschaft) were melted under a nitrogen atmosphere in a three-necked flask, and a mixture of 2 parts by weight of dipropylene glycol and 51.6 parts by weight of a polyoxypropylene glycol (Acclaim™ polyol 4200 from Bayer AG, hydroxyl number of 28 mg KOH/g, molecular weight 4000 g/mol) was added at 80° C. with stirring. The mixture was heated to 80° C. for 1 hour for complete conversion and then cooled. A virtually colorless liquid having an NCO content of 15.8% resulted. The liquid had a shelf life of several weeks at room temperature.

2) Preparation of the Crosslinking Component 52.1 parts of polyoxypropylene (80% by weight)-polyoxyethylene (20% by weight) glycol having a hydroxyl number of 29 mg KOH/g and a molecular weight of 3410 g/mol, prepared using propylene glycol as an initiator molecule 26.9 parts by weight of polyoxypropylene (80% by weight)-polyoxyethylene (20% by weight) glycol having a hydroxyl number of 27 mg KOH/g and a molecular weight of 5180 g/mol, prepared using glycerol as an initiator molecule 16.7 parts by weight of 1,4-butanediol 0.4 part by weight of water 0.1 part by weight of di-n-octyltin bis(2-ethylhexylthioglycolate)

0.3 part by weight of silicone-based foam stabilizer (DC 193 from Dow Corning)

1.8 parts by weight of a mixture of Lupragen® N 203 and Niax® catalyst E-A-1 (GE Silicones)

1.8 parts by weight of cyclopentane

3) Production of the Cylindrical Molding 100 parts by weight of the prepolymer were mixed intensively with 80 parts by weight of crosslinking component at 23° C. and the mixture was introduced into a closable mold thermostated at 55° C. and the foam was cured at 55° C. for 12 min. After demolding of the microcellular product, the shaped article was thermally postcured for 14 h at from 95 to 110° C.

The moldings were tested under the conditions described below with regard to the mechanical and dynamic properties.

Test Conditions

The glass transition temperature was determined according to ISO 6721-7 on S3A tension test bars from the finished part with the aid of a torsional vibrator according to the principle of forced vibration. The glass transition temperature was determined at the maximum of the loss modulus G". The samples were cooled to −80° C., kept at this temperature for 5 min and then heated to 40° C. at a heating rate of 2 K/min. The measuring frequency was 1 Hz.

The static mechanical properties (the density of the test specimen was in each case 0.5 g/cm$^3$) were measured on the basis of the tensile strength according to DIN EN ISO 845, the elongation at break according to DIN EN ISO 1798, the tear propagation resistance according to DIN ISO 34-1 B(b) and the compression set at 70° C. based on DIN EN ISO 1798 using 18 mm high spacers and test specimens having a base area of 40×40 mm and a height of 30±1 mm. The compression set (CS) was calculated according to the equation $$CS=[(H_0-H_2)/(H_0-H_1)]\cdot 100[\%]$$

where $H_0$ is the original height of the test specimen in mm, $H_1$ is the height of the test specimen in the deformed state in mm, $H_2$ is the height of the test specimen after relief in mm.

The dynamic mechanical properties of the test specimen were determined on the basis of the permanent deformation. The test specimens consisted of a cylindrical test spring (cf. FIG. 1). The test specimens were subjected to 100 000 load changes with the force of 4 kN and a frequency of 1.2 Hz. The determination of the height $H_R$ for determining the permanent deformation after the dynamic test was effected after recording the characteristic of the spring: $H_0$ is the initial height. The molding was pressed beforehand three times with maximum force. The characteristic was then recorded in the 4th cycle. The press-in speed was 50 mm/min. After 10 min, $H_1$ was determined, i.e. that of the component after recording of the characteristic. Only thereafter did the dynamic test start. After the dynamic mechanical testing of the test specimens, the permanent deformation (PD) was determined according to the following equation:

$$PD=[(H_0-H_R)/H_0]\cdot 100[\%]$$

where $H_0$ is the original height of the test specimen in mm, $H_R$ is the residual height of the test specimen after the dynamic test, measured after storage for 24 hours at 23° C. and 50% relative humidity.

The permanent deformation is a measure of the residual deformation of the cellular PU elastomers during the continuous vibration test. The smaller its value, the higher the dynamic efficiency of the material. The dynamic test was effected while cooling with a fan in a conditioned room at 23° C. and 50% relative humidity.

TABLE 1

Material properties of the microcellular polyurethane

| Example | Unit | 1 | 2 | Comp. 1 | Comp. 2 | Comp. 3 | Measurement |
|---|---|---|---|---|---|---|---|
| $\overline{M}$(Polyol)*) | [g/mol] | 3600 | 3300 | 4100 | 4000 | 4000 | Calculation, cf. text |
| Hard segment fraction | [% by weight] | 39 | 38 | 34 | 37 | 39 | Calculation, cf. text |
| Static mechanical properties: | | | | | | | |
| Component density | [kg/m$^3$] | 430 | 440 | 460 | 430 | 440 | DIN EN ISO 845 |
| Tensile strength | [MPa] | 2.9 | 2.3 | 3.2 | 3.3 | 2.3 | DIN EN ISO 1798 |
| Elongation at break | [%] | 340 | 240 | 390 | 410 | 200 | DIN EN ISO 1798 |
| Tear propagation resistance | [N/mm] | 11 | 11 | 12 | 10 | 12 | DIN ISO 34-1B(b) |
| Permanent deformation at 70° C. (22 h with 40% deformation) | [%] | 8 | 9 | 9 | 9 | 9 | DIN EN ISO 1856 |
| Decrease in tensile strength in humid warm environment: | | | | | | | |
| Relative decrease in tensile strength in humid warm environment***) after storage time of several days (d) | [%] 0 d | 100 | 100 | 100 | 100 | 100 | DIN EN ISO 1798 |
| | 7 d | 96 | 99 | 64 | 84 | 83 | |
| | 14 d | 92 | 97 | 56 | 72 | 72 | |
| | 21 d | 87 | 95 | 50 | 63 | 57 | |
| | 42 d | 77 | 77 | 36 | nm**) | 50 | |
| | 56 d | 70 | 66 | 33 | nm**) | 41 | |
| | 70 d | 63 | 66 | 30 | nm**) | 37 | |
| | 80 d | 68 | 68 | 27 | nm**) | 34 | |
| Low-temperature flexibility: | | | | | | | |
| Glass transition temperature (max. loss modulus G″$_{max}$) | [° C.] | −53 | nm**) | −58 | −57 | nm**) | ISO 6721-7 |
| Dynamic mechanical properties: | | | | | | | |
| Permanent deformation****) of a spring (cf. FIG. 1) | [%] | 9 | 9 | 9 | destroyed | 11 | Test conditions****) |

*)$\overline{M}$(Polyol): Average polyol molar mass of the polyetherols
**)nm = not measured
***)Storage of tensile strength test specimens in demineralized water thermostated at 80° C. for a period of up to 80 days. Test specimens removed were cooled for 30 min at 23° C., and the tensile strength according to DIN EN ISO 1798 was then determined.
****)Dynamic test conditions: Load 4 kN; frequency 1.2 Hz; number of load changes 100 000 cycles; fan cooling; the percentage permanent deformation (PD) is calculated from the percentage ratio of the residual height of the spring after the test ($H_R$) to the initial height of the spring ($H_0$) before the test: PD = [($H_O$ − $H_R$)/$H_O$)] · 100[%]

We claim:

1. A cylindrical molding comprising a cellular polyurethane elastomer wherein said cellular polyurethane elastomer is the reaction product of
   (i) a prepolymer having isocyanate groups and which is based on
      (a) methylenediphenyl diisocyanate, and
      (b1) polyetherdiol having a molecular weight of from 1500 g/mol to 3000 g/mol and which is based on propylene oxide and/or ethylene oxide;
   with
   (ii) a crosslinking component comprising
      (b2) polyetheralcohol having a nominal functionality with respect to isocyanates of from 2 to 3 and a molecular weight of from 1500 g/mol to 6000 g/mol and which is based on propylene oxide and/or ethylene oxide,
      (c2) diol having a molecular weight of from 62 g/mol to 499 g/mol,
      (d) water, and
      (e) catalysts;
wherein (b1) and (b2) have an average polyol molar mass of from 3000 g/mol to 3700 g/mol, said average polyol molar mass $\overline{M}$(Polyol) being calculated according to the following formula:

$$\overline{M}(Polyol) = \frac{(M_{b11} \cdot m_{b11} + \ldots + M_{b1n} \cdot m_{b1n}) \cdot W_p + (M_{b21} \cdot m_{b21} + \ldots + M_{b2n} \cdot m_{b2n}) \cdot W_v}{(m_{b11} + \ldots + m_{b1n}) \cdot W_p + (m_{b21} + \ldots + m_{b2n}) \cdot W_v}$$

wherein
   $\overline{M}$(Polyol) is average polyol molar mass in g/mol
   $M_{b11}$ (or $M_{b1n}$) is molar mass of polyol b11 (or polyol b1n) in the prepolymer (i) in g/mol
   $M_{b11}$ (or $M_{b1n}$) is mass fraction of polyol b11 (or polyol b1n) in the prepolymer (i) in g/g
   $W_P$: is mass fraction of the prepolymer (i) in the cylindrical molding in g/g
   $M_{b21}$ (or $M_{b2n}$): is molar mass of polyol b21 (or polyol b2n) in the crosslinking component (ii) in g/mol
   $m_{b21}$ (or $m_{b2n}$): is mass fraction of polyol b21 (or polyol b2n) in the crosslinking component (ii) in g/g
   $W_V$: is mass fraction of the crosslinking component (ii) in the cylindrical molding in g/g
wherein said cellular polyurethane elastomers have a density, according to DIN EN ISO 845, of from 300 to 900 kg/m$^3$; a tensile strength, according to DIN EN ISO 1798, of greater than or equal to 2.0 N/mm$^2$; an elongation at break, according to DIN EN ISO 1798, of greater than or equal to 200%; and a tear propagation resistance, according to DIN ISO 34-1 B (b), of greater than or equal to 8 N/mm.

2. The cylindrical molding of claim 1, wherein the prepolymer having isocyanate groups is based on the reaction of (a) methylenediphenyl diisocyanate (MDI), (b1) polyetherdiols having a molecular weight of from 1500 g/mol to 3000 g/mol and based on propylene oxide and/or ethylene oxide and (c1) diol having a molecular weight of from 62 g/mol to 499 g/mol.

3. The cylindrical molding of claim 1, wherein said crosslinking component (ii) comprises n-pentane, 2-methylbutane, and/or cyclopentane as blowing agent (f).

4. The cylindrical molding of claim 1, wherein said molding has a height of from 25 mm to 1000 mm, a maximum external diameter of from 40 mm to 700 mm, and optionally comprises a cavity having a minimum diameter of up to 90 mm.

5. An automobile chassis comprising a shock absorber which comprises a piston rod, wherein the hollow cylindrical molding of claim 1 is placed on said piston rod.

6. A process for producing cylindrical moldings comprising a cellular polyurethane elastomer comprising reacting (i) a prepolymer having isocyanate groups and which is based on (a) methylenediphenyl diisocyanate, and (b1) polyetherdiol having a molecular weight of from 1500 g/mol to 3000 g/mol and which is based on propylene oxide and/or ethylene oxide;

with (ii) a crosslinking component comprising (b2) polyetheralcohol having a nominal functionality with respect to isocyanates of from 2 to 3 and a molecular weight of from 1500 g/mol to 6000 g/mol and which is based on propylene oxide and/or ethylene oxide, (c2) diol having a molecular weight of from 62 g/mol to 499 g/mol, (d) water, and (e) catalysts;

wherein (b1) and (b2) have an average polyol molar mass of from 3000 g/mol to 3700 g/mol, said average polyol molar mass $\overline{M}(Polyol)$ being calculated according to the following formula:

$$\overline{M}(Polyol) = \frac{(M_{b11} \cdot m_{b11} + \ldots + M_{b1n} \cdot m_{b1n}) \cdot W_p + (M_{b21} \cdot m_{b21} + \ldots + M_{b2n} \cdot m_{b2n}) \cdot W_v}{(m_{b11} + \ldots + m_{b1n}) \cdot W_p + (m_{b21} + \ldots + m_{b2n}) \cdot W_v}$$

wherein $\overline{M}(Polyol)$ is average polyol molar mass in g/mol $M_{b11}$ (or $M_{b1n}$) is molar mass of polyol b11 (or polyol b1n) in the prepolymer (i) in g/mol $m_{b11}$ (or $m_{b1n}$) is mass fraction of polyol b11 (or polyol b1n) in the prepolymer (i) in g/g $W_p$: is mass fraction of the prepolymer (i) in the cylindrical molding in g/g $M_{b21}$ (or $M_{b2n}$): is molar mass of polyol b21 (or polyol b2n) in the crosslinking component (ii) in g/mol $m_{b21}$ (or $m_{b2n}$): is mass fraction of polyol b21 (or polyol b2n) in the crosslinking component (ii) in g/g $W_v$: is mass fraction of the crosslinking component (ii) in the cylindrical molding in g/g wherein said cellular polyurethane elastomers have a density, according to DIN EN ISO 845, of from 300 to 900 kg/m$^3$; a tensile strength, according to DIN EN ISO 1798, of greater than or equal to 2.0 N/mm$^2$; an elongation at break, according to DIN EN ISO 1798, of greater than or equal to 200%; and a tear propagation resistance, according to DIN ISO 34-1 B (b), of greater than or equal to 8 N/mm.

7. The process of claim 6, wherein said prepolymer (i) is prepared by reacting (a) methylenediphenyl diisocyanate with (b1) polyetherdiols having a molecular weight of from 1500 g/mol to 3000 g/mol and are based on propylene oxide and/or ethylene oxide and with (c1) diol having a molecular weight of from 62 g/mol to 499 g/mol to form a prepolymer, wherein said prepolymer is subsequently reacted in a mold with crosslinking component (ii).

8. The process of claim 6, wherein said prepolymer (i) is based on methylenediphenyl diisocyanate and isocyanates comprising carbodiimide structures and/or uretonimine structures.

9. The process of claim 6, wherein said crosslinking component further comprises n-pentane, 2-methylbutane, and/or cyclopentane as blowing agent (f).

10. The process of claim 6, wherein said cylindrical moldings are annealed at a temperature of from 70° C. to 140° C. for a duration of from 1 to 48 hours after removal from the mold.

* * * * *